March 7, 1972  D. E. JOHNSON ET AL  3,647,632
APPARATUS FOR CELL CULTURE
Filed April 11, 1968  7 Sheets-Sheet 1

INVENTORS
DENNIS E. JOHNSON
LAWRENCE R. WOODLAND
CHARLES J. KENSLER
PHILIP HIMMELFARB

BY
ATTORNEY

INVENTORS
DENNIS E. JOHNSON
LAWRENCE R. WOODLAND
CHARLES J. KENSLER
PHILIP HIMMELFARB

BY
ATTORNEY

March 7, 1972 D. E. JOHNSON ET AL 3,647,632
APPARATUS FOR CELL CULTURE
Filed April 11, 1968 7 Sheets-Sheet 3

FIG. 6

INVENTORS
DENNIS E. JOHNSON
LAWRENCE R. WOODLAND
CHARLES J. KENSLER
PHILIP HIMMELFARB
BY
ATTORNEY

United States Patent Office 3,647,632
Patented Mar. 7, 1972

3,647,632
APPARATUS FOR CELL CULTURE
Dennis E. Johnson, Cambridge, and Lawrence R. Woodland, Sudbury, Mass., Charles J. Kensler, North Hampton, N.H., and Philip Himmelfarb, Wayland, Mass., assignors to Arthur D. Little, Inc., Cambridge, Mass.
Filed Apr. 11, 1968, Ser. No. 720,711
Int. Cl. C12b 1/10
U.S. Cl. 195—142        6 Claims

ABSTRACT OF THE DISCLOSURE

Method and apparatus for handling cells which may be microorganisms or may be derived from the tissues of living organisms. The method and apparatus permit growing such cells in an active growth state to population densities which may be from 2 to 35 times the densities now possible with present methods and equipment. The cells are maintained suspended in a liquid medium in which is placed a rotating filter. Liquids may be introduced and withdrawn without disturbing the cells. Cell densities may be built up to a high level and used as model tissues to determine the effect of chemical agents on them under conditions which are similar to those in living organisms. The method and apparatus are also suitable for carrying out large-scale industrial processes including the synthesis of organic chemicals as well as the treatment of sewage.

---

This invention relates to method and apparatus for processing and handling cultures of suspended cells which may be microorganisms or may be derived from the tissues of higher organisms, whether plant or animal.

A number of industrial processes, including the manufacture of some organic acids, alcohols, pharmaceuticals, pharmaceutical intermediates, alcoholic beverages and the like, are based upon one or more steps which are brought about through the use of microorganisms such as yeast, fungi, or bacteria as active agents. In these processes it is necessary to provide the microorganisms with liquid nutrient or feedstock material on which they perform a chemical transformation. It is also necessary in such processes to remove the products of such chemical transformation. The liquid nutrient or feedstock may be supplied periodically in a batch operation. Alternatively, it may be supplied continuously at a predetermined given optimum rate with the concomitant removal of some of the product liquid along with the microorganisms suspended therein.

Living cells which are derived from the tissues of higher organisms are grown to provide cell populations for study and for evaluation of treating agents as well as for the by products which result from their growth in a liquid nutrient. Such living cells may be used as models of tissues to determine the effect of chemical agents thereon, and it would be highly desirable to be able to evaluate the response of such cells to transient exposure to such agents.

There are at present several methods of growing cells derived from higher organisms. One of these is a batch process in which the cells are placed in a fixed amount of nutrient and maintained under the desired conditions of temperature and gaseous atmosphere until growth has ceased. Another device for growing cells comprises a type of continuous apparatus in which a portion of the spent nutrient is continuously removed, along with the cells suspended therein. This type of device does not provide any means for continuously separating all or a predetermined portion of the cells from the spent nutrient; and since it is necessary to continuously remove all of the cells which are suspended in the spent nutrient removed, the cell population in any one volume is limited. Another prior art apparatus for growing cells comprises a membrane in which the cells are contained and means for suspending the membrane in the nutrient. In this case the nutrient reaches the cells by the process of free diffusion through the membrane, but the rate of diffusion limits the cell growth rate.

All of the prior art methods for processing and handling cells of the character described possess certain inherent limitations. One of the most serious of these limitations is the fact that there is a fairly well-defined upper limit on the cell population which can be grown within a given volume of liquid, for in the batch process once the nutrient value of the liquid has been consumed, the cells are unable to continue to grow; while in the continuously operated devices, part of the cell population must be continuously withdrawn by virtue of dilution. Moreover, it is difficult to concentrate the cells, once growth has ceased, without damaging them. For example, centrifuging the cells or permitting them to build up on a filtering surface and subsequently scraping them off may do irreparable harm to the cells, and in the case of the use of an external filter would lead to contamination. Moreover, a static internal filtering surface capable of filtering microorganisms would experience pressure drops too quickly to be of any practical use.

In addition to minimizing or entirely eliminating the major disadvantages or limitations of the present methods used in the process or growing of cells, it would also be desirable to be able to effect other treatments of the cells, such as differential separation, the evaluation of the response of the cells to transient exposure to chemical agents and the use of cells in controlled virus propagation. The disadvantages inherent in the prior art methods and apparatus for growing and handling cells are wholly or at least partially overcome by this invention. In addition, the method and apparatus of this invention permit treating or processing cells in a number of ways which have hereto not been satisfactorily possible.

It is, therefore, a primary object of this invention to provide an apparatus capable of achieving cell growth within a fixed volume of liquid nutrient under dynamic or steady state conditions at population densities far greater than heretofore possible. It is another object of this invention to provide apparatus of the character described which, in addition to permitting higher population density growth, provides a means to evaluate the response of cells to transient exposures to chemical agents. It is another important object of this invention to provide apparatus which may be used to concentrate cells without inflicting trauma on them, to wash them or sterilize the liquid in which they are suspended, to separate them according to size, to expose them to continuously changing liquid environments, and to control the amount of byproduct of cell growth which remains in the liquid in which they are suspended.

It is another primary object of this invention to provide an improved method for growing, treating, concentrating, or otherwise processing cells under sterile conditions, and at precisely controllable temperature, pressure and types of atmosphere while doing so. It is yet another object of this invention to provide a method of the character described which permits continuously or periodically varying the liquid medium in which they are suspended. It is another object of this invention to provide cells in the form of a model tissue which permits evaluating the effect of transient exposure of the model tissue to chemical agents. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

The apparatus of this invention incorporates a rotating filter assembly immersed in the liquid in which the cells are suspended. The liquid and filter assembly are contained within a suitable vessel or housing in which sterile conditions may be maintained and in which the atmosphere, temperature and pressure may be accurately and continuously controlled. After initially charging the vessel with liquid and cells, additional liquid may be introduced and spent or reacted liquid withdrawn at essentially the same rate. In one mode of operation, all of the liquid is withdrawn through the filter; and since the filtering surface is designed to prevent passage of any cells, all of the cells are retained within the vessel. In another mode of operation, a portion of the liquid is withdrawn through the filtering surface and another portion is allowed to overflow as spent liquid having cells suspended in it. In either case as the nutrients are consumed from the liquid, more nutrients are fed in; and thus in the case of cell growing, it is possible to build up cell populations within a given volume which are many times greater than heretofore possible in any other type of equipment. Moreover, it is possible to regulate cell population densities independent of growth rate. The liquid introduced into the vessel may be periodically or continuously varied with respect to its composition. In the case of industrial processes, the yeast, fungi, or bacteria may be fed raw feedstock at an optimum rate while retaining as much of the yeast, fungi, or bacteria in a fixed volume as is desired.

In the figures, embodiments of the apparatus designed for growing and treating cells and for the use of microorganisms in industrial processes will be illustrated and described.

Figure 1:
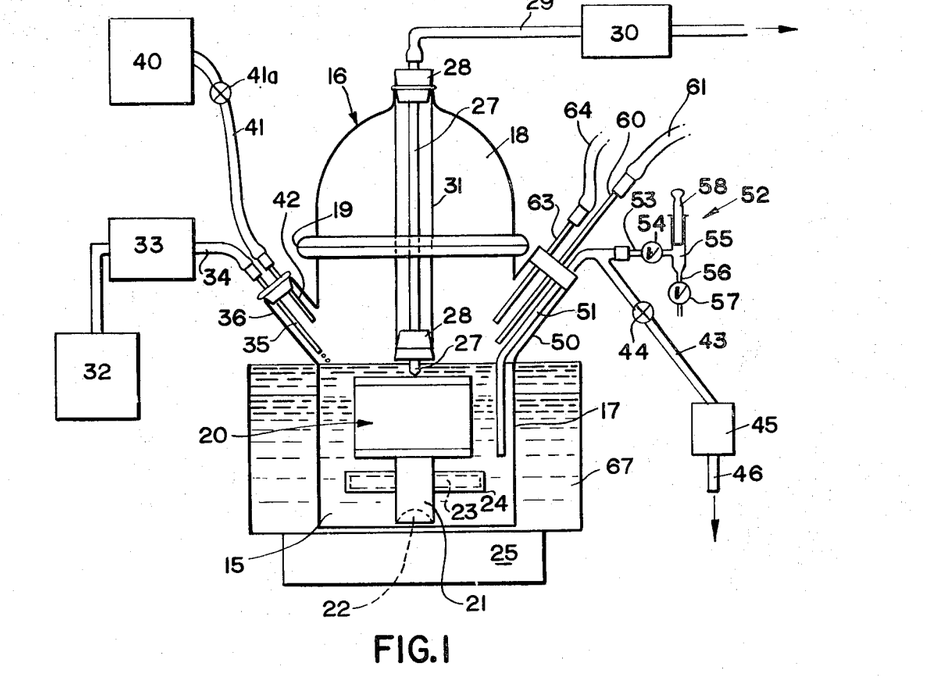
FIG. 1 is a side elevational view, containing some schematic representations of an apparatus constructed according to this invention and suitable for the continuous growth of cells as well as for the variation of the liquid to which the cells may be exposed.

FIGS. 1–5 illustrate apparatus designed for growing or treating cells derived from higher organisms. In FIG. 1 this apparatus is shown in its totality, and in FIGS. 2–5 details of the filter assembly are given.

In FIG. 1 the liquid 15 in which the cells are suspended is maintained in a fluid-tight housing or vessel 16, which in this embodiment is comprised of a lower cylindrical section 17 and an upper dome-shaped section 18 joined through a suitable seal 19 between their flanges. The housing illustrated in FIG. 1 is merely illustrative of one of a number of suitable forms. The primary requirement for the housing is that it be able to define liquid and gaseous zones and provide a sterile environment for the growing cells. The rotating filter assembly 20 has a lower shaft 21 which is supported by and rotates on a foot bearing 22. On the shaft 21 is affixed a bar magnet 23 embedded in a suitable housing 24. A magnetic motor 25 is positioned external of the housing to provide rotation of the filter assembly 20 through magnet 23. Although this means of driving the filter and of agitating the liquid 15 is particularly suited to maintaining a sterile condition, any other suitable means for rotating the filter and agitating the liquid may be used.

A bearing system is provided for the upper part of the filter assembly, and in the embodiment of FIG. 1 it comprises stationary withdrawal tube 27, held in place within a glass channel 31 by means of stoppers 28. Withdrawal tube 27 is in fluid communication with an external withdrawal conduit 29 connected to a suitable pump 30. The manner in which the withdrawal tube 27 serves also in the role of bearing is described below with reference to FIG. 2.

The liquid to be introduced into the vessel is provided from a suitable liquid supply 32 by means of a pump 33 through an external conduit 34 which is in fluid communication with a liquid feed tube 35 extending through housing arm 36 into the vessel and positioned to permit liquid to drop onto the surface of the liquid 15 contained within the vessel. It may be convenient to use a single pump, e.g., a peristaltic pump, to pump in liquid and withdraw liquid, thus pumps 30 and 33 may be combined into a single unit device. In some cell growing operations or cell processing, it is necessary also to provide a controlled rate of gas flow. In the apparatus of FIG. 1, this is accomplished by connecting a suitable gas supply source 40 through conduit 41 (having valve 41a) to a gas feed tube 42 extending by way of housing arm 36 into the interior of the housing.

Another arm 50 of housing section 17 provides means for connecting a liquid withdrawal tube 51 designed in the embodiment of FIG. 1 to provide for both the removal of small liquid samples with cells as well as for the withdrawal of overflow liquid containing suspended cells. Thus in FIG. 1 for a sample withdrawal means there is provided a Cornwall syringe 52 which comprises an arm 53 having a one-way check valve 54, communicating between the liquid withdrawal tube 51 and the barrel 55 of the syringe. The barrel has a cannula 56, which also has a one-way check valve 57. Movement of the plunger 58 in an upward direction causes liquid to flow into the barrel, and subsequent movement of the plunger downwardly discharges the liquid through the cannula into suitable sample collection means (not shown). Branching from liquid withdrawal tube 51 is a liquid draw-off arm 43, having a valve 44, which provides fluid communication by way of pump 45 and line 46 to a liquid collection reservoir, not shown.

In addition, the apparatus of FIG. 1 is shown to have a gas withdrawal tube 60 connected to a conduit 61 and an additional tube 63 connected to an external conduit 64 which may lead to a manometer (not shown) or may serve as an additional means for introducing a fluid (e.g., chemical agent) into the system. It will be appreciated that any one apparatus may or may not have all of the connections illustrated in FIG. 1. The number and use to which they are put will, of course, depend upon the purpose of the apparatus and the process to be carried out therein.

Since normally it will be desirable to control the temperature of the environment defined within the vessel, means are provided for this in FIG. 1. In the embodiment illustrated these means comprise a constant temperature bath 67 in which the liquid level is maintained to essentially correspond with the level of the liquid contained within the vessel. Suitable well-known means (not shown) are provided for maintaining the liquid of the constant temperature bath at the desired temperature. Other temperature controlling means are also, of course, within the scope of this invention.

Figure 2:
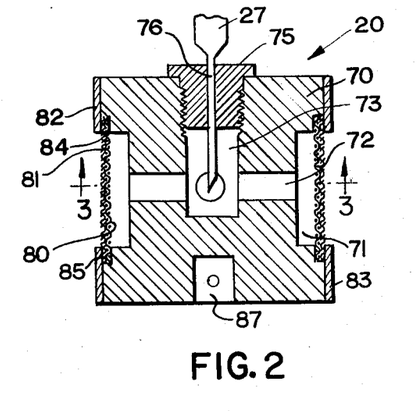
FIG. 2 is a detailed cross section of one embodiment of a filter assembly suitable for use in the apparatus of FIG. 1.
Figure 3:
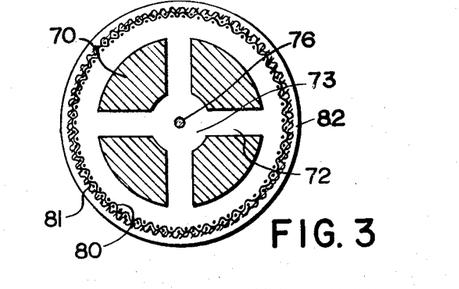
FIG. 3 is a cross section of the filter assembly of FIG. 2 along line 3—3 of that figure.

FIGS. 2 and 3 are cross sectional drawings illustrating the filtering assembly 20 in detail. In these figures, like numbers refer to like elements. This embodiment of the filtering assembly is conveniently formed of a block of nylon (polyamide) 70 which is machined to have a central peripheral groove 71 and several radial passages 72, which communicate with a central chamber 73. The upper portion of this chamber is threaded to receive a threaded Teflon plug 75, through which the cannula 76 of a hypodermic needle or tubing extends. The hypodermic needle or tubing itself serves as the lower portion of the withdrawal tube 27. The plug 75 serves in the dual role of closure for the chamber 73 and as a bearing for the stationary cannula 76, and the fit between cannula 76 and plug 75 is such as to form a seal.

The filtering surface of the filter assembly is made up of an inner supporting wire screen 80 formed, for example, of a fine-mesh stainless steel screen, and a filtering surface 81 having openings in the range of about 0.2 to 8 microns. The supporting screen and the filtering surface (e.g., a filtering fabric) are held onto the filter block 70 by means of upper band 82 and lower band 83, which grip the screen and fabric to hold them in the grooves 84 and 85. The filter block has a well 87 drilled in the center of its lower portion in which the support shaft 21 (FIG. 1) is mounted.

Figures 4, 5:
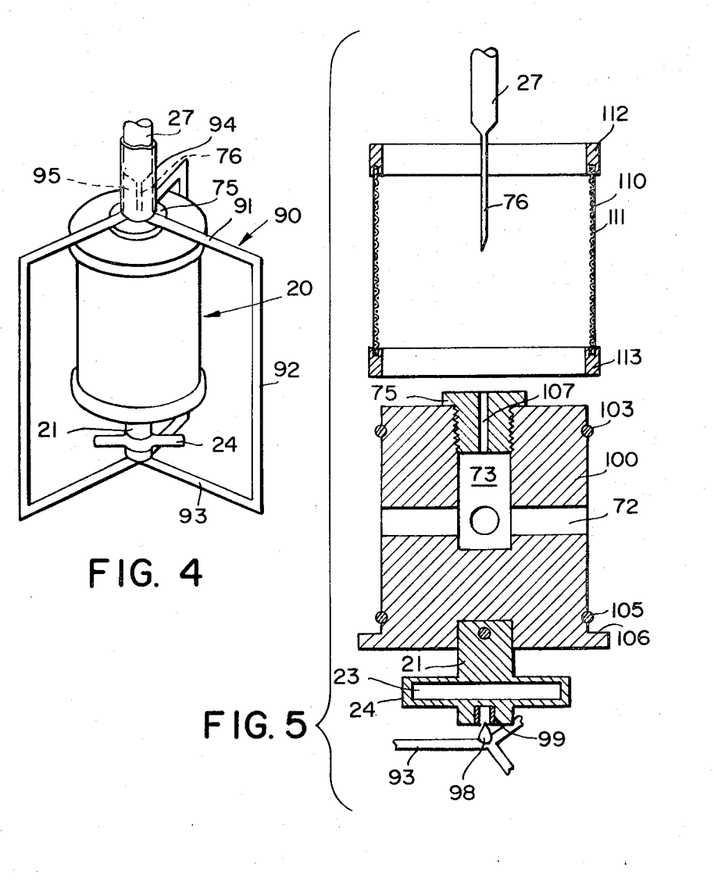
FIG. 4 is a perspective view of another embodiment of a filter assembly which may be used in the apparatus of FIG. 1 and which is particularly suitable for the rapid interchange of filter assemblies.
FIG. 5 is an expanded cross sectional view of the filter assembly of FIG. 4.

FIGS. 4 and 5 illustrate in perspective and cross sectional views a modification of the filter assembly suitable for use in the apparatus of FIG. 1. This filter assembly has the advantage of being more easily aligned than the assembly of FIG. 1 since the withdrawal tube 27 is not relied upon to sustain alignment. Moreover, the filter assembly of FIGS. 4 and 5 can be readily interchanged in the apparatus. The filtering assembly 20 is mounted in a frame generally indicated by numeral 90, which consists of three frame structures, each of which is comprised of a top horizontal plate 91, vertical bars 92, and bottom horizontal plate 93. The top horizontal plate 91 is affixed by any suitable means to a plug 95 which in turn is friction fixed to cylindrical sleeve 94. Sleeve 94 serves to align the cannula 76 and withdrawal tube 27. The filter assembly is free to rotate while the withdrawal means and frame 90 remain stationary. As will be seen in FIG. 5, there is a foot bearing 98 located at the juncture point of the bottom horizontal plate 93. This foot bearing 95 in turn engages a jewel bearing 99 mounted within the bottom of the suport 21. Any other suitable means for supporting the filter assembly shaft may also be employed.

In the embodiment of the filtering assembly shown in FIG. 5, the filter block has an upper sealing ring 103 and a lowering sealing ring 105, as well as a bottom retaining ring 106. The filtering surface is formed of a supporting screen 110 and a filtering surface 111. This filtering surface may be any one of the commercially available high efficiency filter media, a membrane, fabric or electroformed gold mesh. The choice of filtering surface material will depend primarily upon the size of pores desired.

The screen and foil mounted in the upper ring 112 and lower ring 113 form a structure of sufficient rigidity to permit the assembly to be readily slipped down over the filter block 100. The lower ring 113 engages the sealing ring 105 and rests upon the retaining ring 106, while the upper ring 112 engages the upper sealing ring 103. Sufficient space exists between the filtering surface assembly and the walls of block 100 to form a fluid passageway which communicates with the four radial passages 72, the the chamber 73, and the passage within the cannula 76 to provide for fluid withdrawal.

Figure 6:
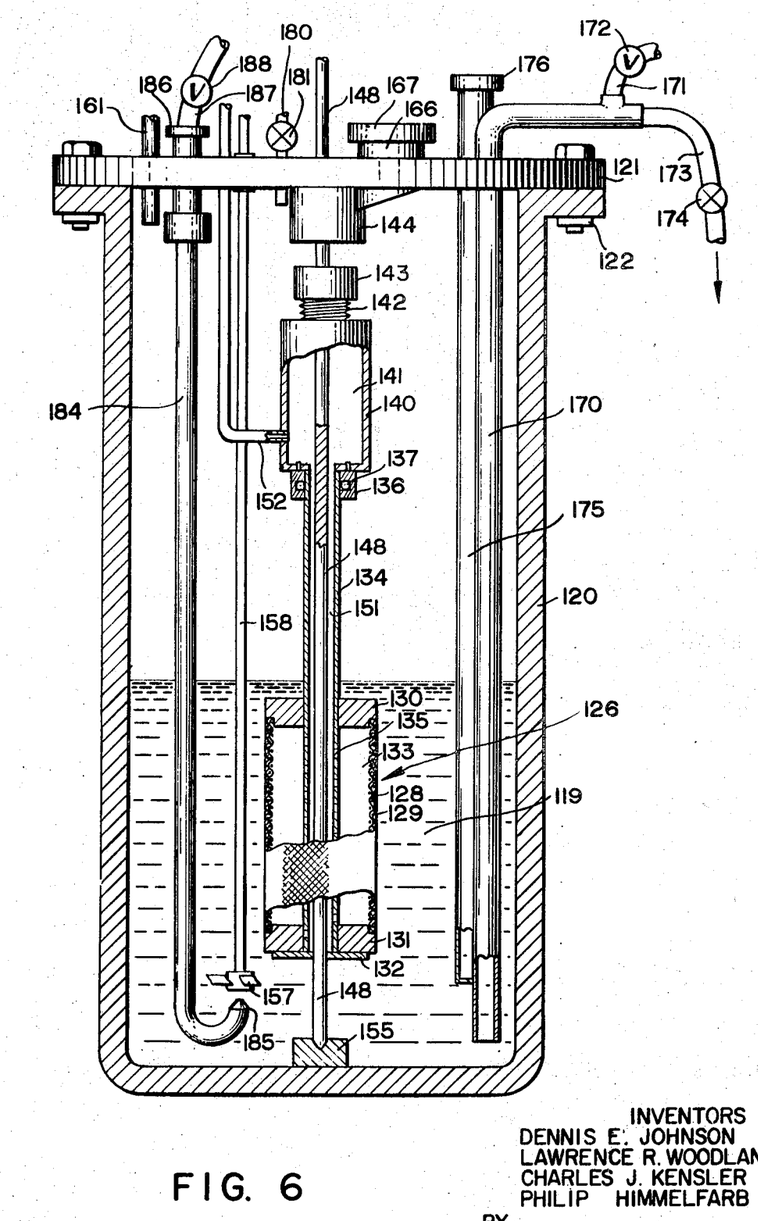
FIG. 6 is a cross section of an apparatus constructed in accordance with this invention suitable for large-scale industrial processing.

FIG. 6 illustrates in cross section an apparatus constructed in accordance with this invention which is particularly suitable for large-scale industrial applications in which micro-organisms are employed in carrying out reactions to process activated sludge and to produce chemcials, pharamceuticals, or alcoholic beverages. Several examples of such processes may be cited. These examples are, however, in no way meant to limit the application of the method of this invention but are given to illustrate some of the general types of processes which may be carried out. Bacterial fermentation is employed to produce lactic acid from such raw materials as molasses, starch hydrolyzates and whey using *Lactobacillus casei;* and to produce neutral solvents and alcohol from grain meal and mash using *Clostridium acetobutylicum.* Fermentations using fungi such as *Aspergillus niger* to produce citric acid from sugar solutions and extracts of lemons and limes, and *Streptomyces aureofaciens* to produce tetracylines are also widely used industrial processes. Finally, as an example, we may cite yeast fermentation processes to produce alcoholic beverages.

Figure 7:
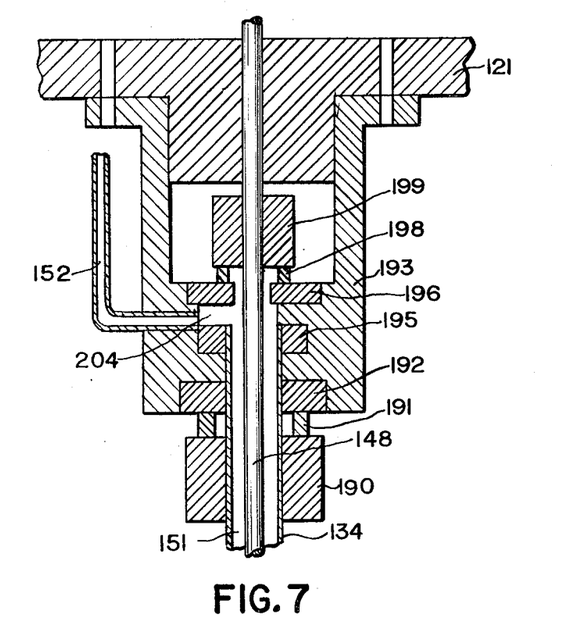
FIG. 7 is a cross section of a modification of the upper section of the apparatus of FIG. 6.

The apparatus of FIGS. 6 and 7 are suitable for carrying out industrial processes, examples of which have been listed above.

In the apparatus of FIG. 6, the liquid 119 forming the feedstock or liquid medium is maintained within a suitable vessel 120, having a cover 121 designed to make a fluid-tight seal with the vessel using suitable closing means such as bolts 122. The temperature of the liquid 119 within the vessel may be maintained constant by any suitable means such as heating or cooling coils within the vessel or an external jacketed wall for controlling the temperature and maintaining it at any desired level.

The filter assembly indicated generally by numueral 126 is comprised of a supporting screen 128 and a filtering surface 129, the two being mounted on an upper frame 130 which serves as the top of the filtering assembly and on a lower frame 131 which serves as the bottom of the filtering assembly. The filtering assembly is affixed to a support plate 132, and within the filtering assembly there is defined an internal volume 133 into which the liquid to be removed passes prior to its withdrawal from the system. The filtering assembly is mounted on a hollow filter shaft 134 which has perforations 135. Shaft 134 is aligned by and rotates within bushing 136 containing O-ring 137 as a seal. Shaft 134 is affixed to a stationary housing 140 which defines a withdrawal chamber 141. This housing is closed by screwing adapter 142 into housing 140. Adapter 142 acts as the upper bearing for housing 140 and contains an O-ring to seal against shaft 148. In a fashion similar to bushing 136, bushing 143 serves as an upper alignment means for shaft 148. Shaft 148 is mechanically connected to a driving means (not shown), and it extends through cover member 121, block 144, liquid withdrawal chamber 141, and through hollow filter shaft 135 and the support plate 132 to which it is affixed. Shaft 148 is supported on the bottom of the vessel by foot bearing 155. Other suitable support and aligning means may, of course, be substituted for the foot bearing 155.

The arrangement illustrated in FIG. 6 furnishes the means for rotating the filter assembly while providing for liquid withdrawal through annular passage 151 defined between the wall of shaft 148 and the internal wall of hollow shaft 135. The liquid to be withdrawn from the vessel thus passes through the filtering surface into volume 133 and then through perforations 135, annular passage 151, and into withdrawal chamber 141 from where it is discharged. Cell-free liquid may be withdrawn from the system by pressurizing the contents of the vessel 120 and allowing this pressure to force the liquid through the filter and out through withdrawal tube 152 or, alternatively, by applying a vacuum by any suitable means to tube 152. Thus by establishing and maintaining a pressure differential between the interior of the vessel and an external liquid discharge point, cell-free liquid is withdrawn from the vessel.

The liquid 119 is kept in an agitated condition by suitable means such as by impellor 157 mounted on shaft 158 driven externally by suitable means. Such agitation should be sufficient to maintain the microorganisms suspended in the liquid 119.

In the cover member there are provided a liquid inlet line 161 and an inoculation port 166 having a removable cap 167. The inlet line 161 terminates internally of the vessel well above the liquid level. A liquid withdrawal tube 170, extending well below the surface of liquid 119, allows a suspension of cells to be removed either for recovery of cells in cases in which this is the desired product or for the purpose of controlling cell population in the vessel where chemical conversion is desired. Optionally, as illustrated in FIG. 6, withdrawal tube 170 may be connected to a sample withdrawal tube 171, having valve 172, as well as to a primary liquid withdrawal conduit 173 (having valve 174) which is in fluid communication with a liquid reservoir, not shown.

A thermometer well 175 may also extend below the surface of liquid 119, and it is fitted with a removable cap 176 external of the vessel. If gas is to be supplied to the vessel or is generated in the reactions taking place within the vessel, it may be periodically or continuously withdrawn through a gas discharge tube 180 having a valve 181. In some reactions it may be desirable to provide a gaseous component or a reactant below the surface of the liquid, and this may be accomplished through the gas inlet tube 184 which terminates in a suitable nozzle 185. The extension of gas inlet tube 184 external of the vessel terminates in an adapter 186 making it suitable for attachment of a gas supply tube 187 controlled by valve 188. As in the case of the apparatus of FIG. 1, the number and use of these external connections will vary depending upon the use of the apparatus.

FIG. 7 illustrates a modification of the means by which the two shafts are mounted and supported. In this modification, in which like numbers refer to like elements, the hollow shaft 134 rotates in a rotary seal 190, which, through rotating ring 191, bears on a stationary ceramic seal 192 which in turn is mounted in a support block 193. There are also provided a bushing or bearing 195 and a second stationary ceramic seal 196, which, through ring 198, is affixed to a second rotary seal 199. The sealing of shaft 148 in the vessel is completed through the use of any suitable well-known mechanical seal or packing in the vessel cover member 121. Likewise, the shaft 148 is supported with appropriate bearings within the top of the vessel. As in the case of the apparatus of FIG. 6, the liquid to be withdrawn from the vessel passes upwardly through annular passage 151 and then through a radial passage 204 into fluid withdrawal tube 152.

Figure 8:
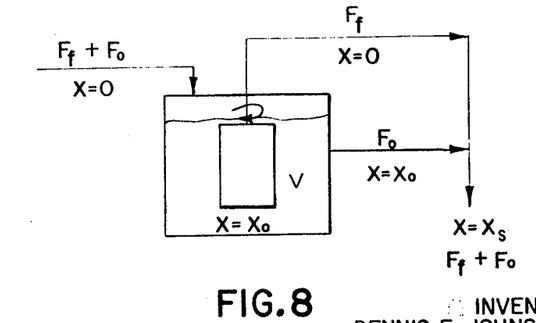
FIG. 8 is a diagram illustrating the flow balance of the system.

FIG. 8 is a somewhat simplified materials balance model which may be used to determine the mathematics of the cell handling system of this invention. For the model of FIG. 8, which can be considered for illustrative purposes to represent a continuous fermentation system, it is possible to write an equation for the steady state conditions as $$X_s = \left[\frac{F_f + F_o}{F_o}\right] X_s$$

where $X$ = cell concentration
$X_o$ = new cell concentration in the fermentor due to rotating filter operation and cell retention
$X_s$ = normal cell concentration in the fermentor for conventional continuous fermentation
$F_f$ = flow rate of cell-free spent nutrient through the rotating filter of this invention
$F_o$ = overflow rate of spent liquid suspension of cells from the fermentor.

The specific growth rate, $\mu$, of the cells for conventional continuous culture methods and apparatus is given by the dilution wash-out rate, which in the nomenclature of FIG. 8 may be represented as $$\frac{F_f + F_o}{V} = \mu$$

wherein V is the liquid volume in the vessel. For the apparatus of this invention, the specific growth rate can be shown to be $$\mu = \frac{F_o}{V}$$

Thus, the cell population density and the specific cell growth rate can be varied independently of each other. It is believed that this is unique to the method and apparatus of this invention.

The net yield of cells per unit volume of nutrient added would be predicted (and has been so measured) to be the same as in conventional continuous fermentation wherein cells are withdrawn along with the total spent liquid. However, the fermentor production capacity (cells per unit volume per unit time) of the apparatus of this invention is increased by the factor of $$\frac{F_f + F_o}{F_o}$$

This increase has been measured using *Lactobacillus casei* to produce lactic acid from starch hydrolyzate. As a control, a conventional continuous fermentation was conducted; and it gave a steady state cell concentration $X_s$ of $4.8 \times 10^9$ cells/ml. and an overflow at an overflow rate $F_o$ of 1.7 liters/day. A rotating assembly as shown in FIG. 6 was then incorporated in the fermentor, and the system was operated with a filter flow rate $F_f$ and an overflow rate $F_o$ both at 1.7 liters/day. A cell concentration of $9.1 \times 10^9$ cells/ml. in the fermentor and overflow $F_o$ resulted. Thus, within the accuracy of measurement, the use of the method and apparatus of this invention resulted in essentially doubling the capacity of the ferementor without experiencing any significant decrease in cell yield per unit of nutrient consumed. Furthermore, because of the rotation of the filter (typically at 200 r.p.m.) the filter cake did not build up at an excessive rate. For example, pressure drops ranging between 0.5 and 1.3 cm. Hg/day were experienced over 3 to 5 days' continuous operation periods. Moreover, the filter can easily and readily be back washed in place in sterile fashion simply by momentarily reversing the liquid flow through line 152 and of the filter. Thus over a 30-day continuous run of the above described fermentation using apparatus similar to that shown in FIG. 6, the pressure drop across the rotating filtering assembly did not exceed 38 cm. Hg.

Figure 9:
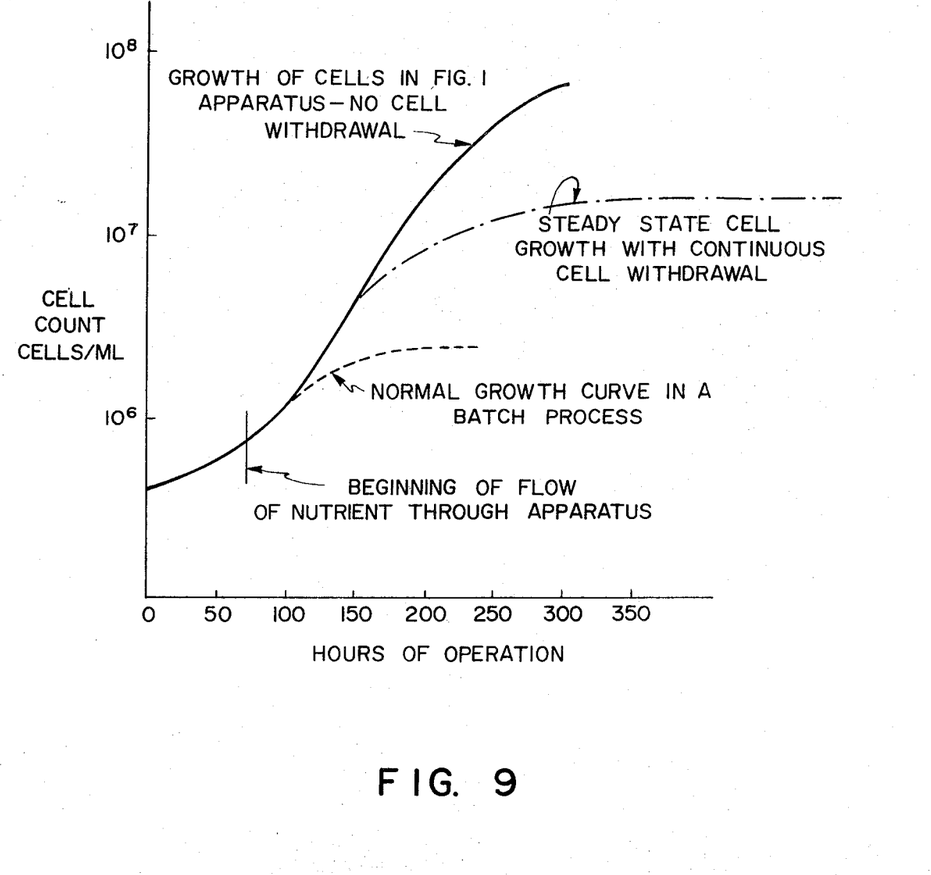
FIG. 9 is a plot of cell growth with time for a typical prior art batch process and the methods of this invention.

FIG. 9 illustrates the value of the method and apparatus of this invention for the propagation of high-population densities of mammalian cells, in this case the mouse leukemia—L1210. Fischer's medium containing 10% horse serum was perfused through the cell culture apparatus of FIG. 1 (volume equalling ~400 ml. at flow rates of 30-70 ml. per hour, while at the same time an equal amount of spent medium along with metabolic products was withdrawn from the culture. The liquid was, of course continuously agitated by the magnetic stirring mechanism which also provided the means for rotating the filtering assembly. With this method of nutrient replenishment, the cell density reached 60–70 million cells per mil., as represented by the solid line in FIG. 9. This density is well above the maximum which is customarily achieved by standard culture methods, that is, 2–3 million cells per ml., as represented by the dotted line. The number of cells grown per unit nutrient consumed was essentially the same as for a batch process. It is therefore possible to increase the cell yield for a given volume of apparatus by as much as 30 to 35 times that previously attained without sacrificing efficient use of nutrient. In FIG. 9, a third line (dot-dash) has been added to illustrate the mode of operation of the apparatus of this invention in which a portion of overflow liquid with suspended cells is withdrawn. Since the cell population density and specific cell growth rate may be varied independently (as previously explained), this steady state cell growth with continuous cell withdrawal may be adjusted at will, thus providing for flexibility of operation.

Figure 10:
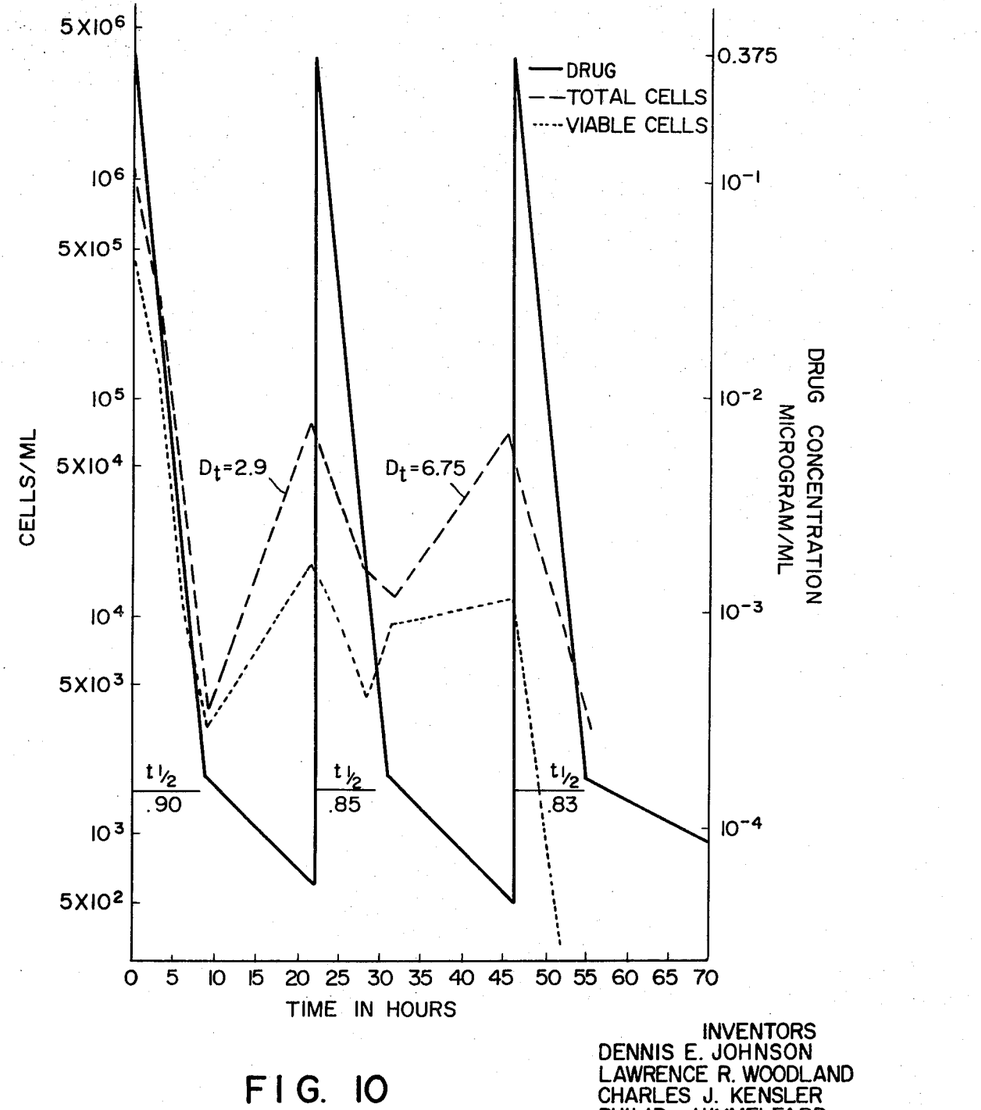
FIG. 10 is a plot illustrating the use of the apparatus of this invention as a model tissue to determine the effect of a chemical agent on cells grown therein.

The apparatus of this invention may also be used to study the effects of drugs on actively growing populations of cells serving as a model tissue. Varying drug concentration vs. time relationships can be established and their effects upon the cell populations studied. For example, after a drug is added to the culture, the perfusion rate can be increased to result in a drug removal rate equivalent to that which would occur in the animal body. FIG. 10 plots the result of such an experiment in which the mouse leukemia L1210 cells in the apparatus of FIG. 1 were treated with amethopterin, an anti-leukemic drug, on three successive days. After each addition of drug, the flow-rate was increased so that the drug was washed through at a half-time in the vessel of 0.8 to 0.9 hour. This high flow-rate was held for 9 hours, sufficient for the drug level to be reduced to ineffective levels. Total cell counts and viable cell counts (the latter determined by a colony-formation assay) were determined throughout the duration of the experiment. There were 99.7%, 78.8%, and 94.7% kills of cells during each of the three respective treatments. It will thus be appreciated that this apparatus provides a very valuable tool for evaluating chemical treating agents. The ability to grow a very dense cell population within a given volume provides a much improved tissue model; and the ability to subject the cells to a chemical agent and then wash it out enables the experimenter to closely simulate in vivo conditions.

By controlling the quantity and composition of the liquid perfused through the apparatus, it is possible to wash the cells, to treat them selectively and to sterilize the liquid in which they are suspended.

A final example of the use of the method and apparatus of this invention may be cited. This involves the treatment of sanitary or industrial sewage by the use of activated sludge. by replacing the usual gravity settler thickeners (i.e., the secondary clarifiers) or the aeration tanks and the secondary clarifiers with the apparatus of this invention, the residence time of the activated sludge in this step can be materially reduced thereby minimizing or eliminating the problem of microorganism anaerobiosis, reducing the size of the equipment and providing an overall more efficient method and apparatus.

The use of activated sludge is one of the most economical methods of removing soluble organic matter from dilute solutions. It has, however, three principal disadvantages. The first of these is that the volume of the aeration tanks must be large because of the dilute concentration of the organic matter. The second disadvantage is the inherent inefficiency of phosphate removal from the solution which in turn contributes to eutrophication of the receiving waters. Finally, the resulting excess sludge exhibits poor filtering characteristics. A secondary clarifier is customarily used to remove the activated sludge from suspension, and a major portion of the sludge is recycled to improve the kinetics of the reaction while the remaining sludge is passed through filters to effect final dewatering before disposal. Since the secondary clarifier operates on gravitational settling, no aeration is permitted. The final result is poor phosphate removal which has been demonstrated to be inversely related to the degree of oxygenation of the organisms. Thus, it would be desirable to be able to aerate activated sludge, to overcome its natural poor filtering characteristics, and if possible to reduce the equipment volume.

Figure 11:
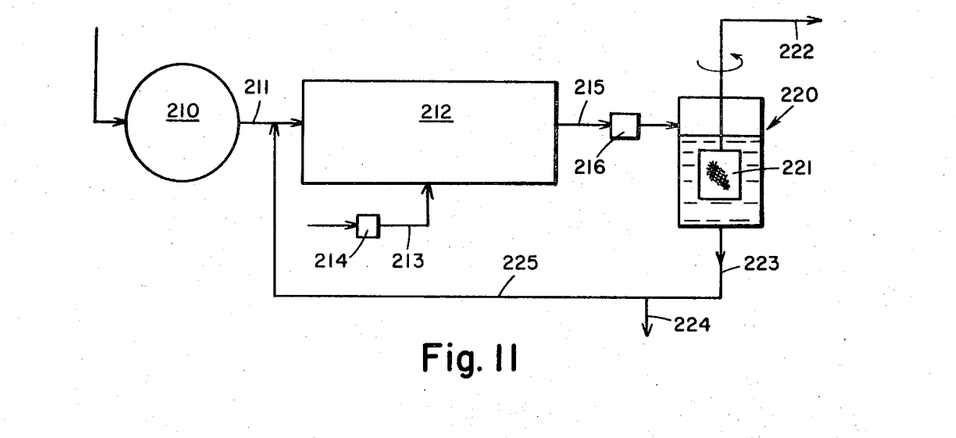
FIG. 11 is a schematic diagram showing the use of the apparatus of this invention is a sewage treatment plant which incorporates an aeration tank.
Figure 12:
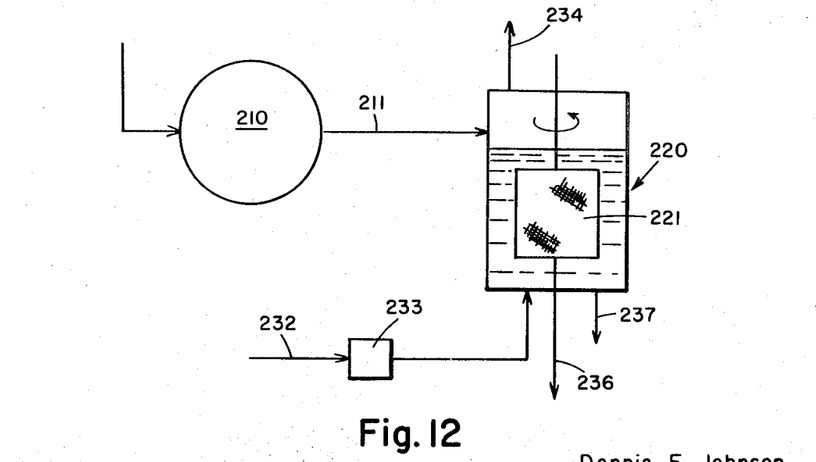
FIG. 12 is a schematic diagram showing the use of the apparatus of this invention in place of an aeration tank in a sewage treatment plant.

FIGS. 11 and 12 illustrate diagrammatically the use of the method and apparatus of this invention for handling microorganisms in the processing of sewage. In the system of FIG. 11, the apparatus of this invention has replaced the conventional secondary clarifiers; while in the system of FIG. 12 the apparatus of this invention has replaced both the secondary clarifiers and the areation tanks.

In the arrangement of FIG. 11, the raw sewage is delivered to a primary settler 210 from which overflow line 211 discharges the upper portion of the liquid into the aeration tank 212, which is typically open to the atmosphere. Air, by way of line 213 and pump 214, is introduced into the bottom of tank 212. Periodically the liquid from tank 212 is withdrawn by line 215 and pump 216 and introduced into the apparatus 220 of this invention such as illustrated in FIG. 6. That portion of the liquid which is to be withdrawn as clear effluent passes through the rotating filter 221 and is discharged through line 222. Simultaneously, a portion of the liquid containing activated sludge is discharged through line 223 which branches into line 224 to remove excess sludge and into line 225 to recycle sludge into overflow line 211.

The substitution of the apparatus of this invention for the secondary clarifiers prevents or minimizes anerobiosis of the microorganisms, and if desired, air or oxygen may be introduced into the apparatus 220. The effects of the filtering characteristics of the sludge are also materially reduced in this apparatus.

In addition to preventing anaerobiosis of the microorganisms and to avoiding difficulties in filtering, the arrangement in FIG. 12 also materially reduces equipment volume by eliminating the customary aeration tanks. In this arrangement the apparatus 220 may be pressurized to create sufficient hydraulic head to cause the filtrate to pass through the filter assembly 221. However, an alternative arrangement is illustrated in FIG. 12 in which provision is made for the filtered liquid to flow downwardly under gravity and out through line 236. Air is introduced into the liquid through line 232 by means of blower 233, and the excess sludge is withdrawn through line 237. Line 234 provides means to discharge excess gas.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. Fermentation apparatus in which cells are suspended in a liquid medium and in which cell population density is independent of specific cell growth rate, comprising in combination (a) a fluid-tight vessel defining therein a liquid zone and a gaseous zone;

(b) a cylindrical vertically positioned filtering assembly located within said liquid zone and having a filtering surface with openings smaller than said cells;

(c) a rotatable shaft to which said filtering assembly is affixed for rotation;

(d) means for rotating said shaft;

(e) fluid flow path means adapted for removal of cell-free liquid from said liquid zone comprising the interior volume of said filtering assembly; an annular fluid passage which is in fluid communication with said interior volume of said filtering assembly and which surrounds said shaft means, a stationary withdrawal chamber located internally of said vessel within said gaseous zone and in fluid communication with said annular fluid passage, and fluid conduit means extending from said withdrawal chamber external of said vessel;

(f) means to continuously agitate said liquid;

(g) liquid inlet means adapted to introduce liquid feedstock above the surface level of said liquid zone; and (h) liquid discharge means adapted to withdraw liquid containing suspended cells from below the surface of said liquid zone.

2. An apparatus according to claim 1 including means for introducing gas into said vessel.

3. An apparatus suitable for processing cells which are suspended in a liquid medium, comprising in combination (a) vessel means adapted to contain a liquid under controlled and predetermined sterile conditions of pressure, temperature and quality of atmosphere to define therein a liquid zone and a gaseous zone;

(b) cylindrical rotatable filtering assembly means being adapted to rotate beneath the surface of said liquid zone and comprising in combination (1) a cylindrical filtering member, (2) a cylindrical rotatable filter support member having a peripheral channel centrally positioned between its upper and lower ends, and being adapted to hold said cylindrical filtering member in a fixed position over said peripheral channel thereby to define an annular fluid passage between said filter member and said filter support member, said filter support member having a central chamber in fluid communication with said annular passage through a plurality of radial passages, (3) stationary fluid withdrawal tube means about which said filter support member is rotatable and in fluid communication with said central chamber in said filter support member, said fluid withdrawal means extending externally of said vessel means to communicate with an external discharge means, (4) sealing means providing a fluid-tight seal between said stationary fluid withdrawal tube means and said filter support member, (5) magnet housing means mounted on the lower end of said filter support member, and (6) drive magnet means within said magnet housing means;

(c) magnetic motor means external of said vessel means adapted to actuate said drive magnet and rotate said filter support member;

(d) means adapted to effect a pressure differential between the interior of said vessel and said external discharged means whereby cell-free liquid may be withdrawn from said liquid zone by way of said stationary fluid withdrawal tube means; and (e) liquid inlet means adapted for introducing liquid above the surface level of said liquid zone.

4. An apparatus according to claim 3 including means adapted to introduce gas into said vessel means and withdraw gas from said gaseous zone.

5. An apparatus according to claim 3 including means for maintaining the temperature of said liquid zone at a predetermined level.

6. An apparatus in accordance with claim 3 including liquid withdrawal means adapted to withdraw cell-containing liquid from below the surface of said liquid in said liquid zone.

References Cited
UNITED STATES PATENTS

| | | | |
|---|---|---|---|
| 2,670,849 | 3/1954 | Dunmire | 210—360 A |
| 3,078,166 | 2/1963 | Hough et al. | 195—139 X |
| 3,241,675 | 3/1966 | Pashaian et al. | 210—360 A |
| 3,363,711 | 1/1968 | Walters | 210—360 A |
| 3,172,235 | 3/1965 | Björklund | 195—142 X |

OTHER REFERENCES

Bhagat et al., University of California Lawrence Radiation Laboratory, "Filtration Studies with Ultrafine Particles," reproduced by Clearinghouse for Federal Scientific and Technical Information, Springfield, Va.

A. LOUIS MONACELL, Primary Examiner

M. D. HENSLEY, Assistant Examiner

U.S. Cl. X.R.

195—143, 144; 210—360